US006092042A

United States Patent [19]

Iso

[11] Patent Number: 6,092,042

[45] Date of Patent: Jul. 18, 2000

[54] SPEECH RECOGNITION METHOD AND APPARATUS

[75] Inventor: Kenichi Iso, Tokyo, Japan

[73] Assignee: NEC Corporation, Tokyo, Japan

[21] Appl. No.: 09/050,948

[22] Filed: Mar. 31, 1998

[30] Foreign Application Priority Data

Mar. 31, 1997 [JP] Japan ................................. 9-080547

[51] Int. Cl.$^7$ ................................................ G10L 15/08
[52] U.S. Cl. ............................................ 704/240; 704/255
[58] Field of Search ................................... 704/240, 243, 704/245, 249, 250, 254, 256, 236, 255, 257

[56] References Cited

U.S. PATENT DOCUMENTS

| | | | |
|---|---|---|---|
| 5,230,037 | 7/1993 | Giustiniani et al. | 704/200 |
| 5,598,507 | 1/1997 | Kimber et al. | 704/246 |
| 5,608,841 | 3/1997 | Tsuboka | 704/240 |
| 5,682,501 | 10/1997 | Sharman | 704/260 |
| 5,721,808 | 2/1998 | Minami et al. | 704/256 |
| 5,778,341 | 7/1998 | Zeljkovic | 704/256 |
| 6,009,390 | 3/1997 | Gupta et al. | 704/240 |

FOREIGN PATENT DOCUMENTS

| | | |
|---|---|---|
| 0 786 761 | 7/1997 | European Pat. Off. . |
| 6-266384 | 9/1994 | Japan . |
| 8-123463 | 5/1996 | Japan . |

OTHER PUBLICATIONS

Papers of the Institute of Electronics, Information and Communications Engineers, vol. J77–A, No. 2, Feb. 1994, "Applications in Speakers Without Instructors Using Whole Sound Ergodic HMM", pp. 112–119, (Published Feb. 25, 1994).

Technical Research Reports of the Institute of Electronics, Information and Communications Engineers [Audio] vol. 92, No. 274, SP92–75, "Applications in Speakers Without Instructors Using Whole Sound Ergordic HMM," pp. 15–20 (Published Oct. 21, 1992).

Technical Research Reports of the Institute of Electronics, Information and Communications Engineers [Audio] vol. 92, No. 410, SP92–129 Distinguishing Many Languages by means of Audio Using Ergodic HMM p. 49–66 (Issued Date: Jan. 19, 1993).

Papers of the Institute of Electronics, Information and Communications Engineers, vol. J77–A, No. 2, Feb. 1994, "Language Recognition by means of Audio Using Ergodic HMM and its State Sequences," p. 182–189, (Issue Date: Feb. 25, 1994).

L.R. Rabiner, B–H. Juang, Translated by Akira FURUI "Introduction to Speech Recognition" (Final Volume) Date of Publication: Nov. 1995, NTT Advanced Technology, pp. 135–138.

Rabiner et al., "Fundamentals of Speech Recognition", Prentice Hall, ISBN–0–13–055157–2, pp. 348, 458–460 1993.

*Primary Examiner*—David R. Hudspeth
*Assistant Examiner*—Martin Lerner
*Attorney, Agent, or Firm*—Foley & Lardner

[57] ABSTRACT

Speaker independent speech recognition is made highly accurately without setting any recognition unit, such as triphone, and by taking environment dependency of phonemes into considerations. A word dictionary unit 10 stores phoneme symbol series of a plurality of recognition subject words. A transition probability memory unit 20 stores transition probabilities associated with N×N mutual state transitions of N states in a given order to one another. An output probability memory unit 30 stores phoneme symbol output probabilities and feature vector output probabilities associated with the respective state transitions. A work comparing unit 40 calculates probabilities of sets of unknown input speech feature vector time series and hypothetical recognition subject words. A recognition result output unit 50 provides a highest probability word among all the recognition subject words as a result of recognition.

14 Claims, 3 Drawing Sheets

SPEECH RECOGNITION METHOD AND APPARATUS

BACKGROUND OF THE INVENTION

The present invention relates to speech recognition method and apparatus for recognizing unknown input speeches and, more particularly, to large vocabulary speech recognition method and apparatus which permit recognition of a large number of words.

For large vocabulary speech recognition, a method is extensively used, which relates to triphone HMMs (Hidden Markov Models). Specifically, this method uses "triphone units" as recognition units, which are each prepared for adjacent phonemes present as a phoneme unit in a word (or sentence). The "triphone HMM" is detailed in "Fundamentals of Speech Recognition, Part I, Part II, NTT Advanced Technology Co., Ltd, ISBN-4-900886-01-7" or "Fundamentals of Speech Recognition, Prentice Hall, ISBN-0-13-055157-2".

In the speech recognition based on triphone HMMs, however, as many different HMMs as the cube of the number of different phonemes are involved, and it is difficult to accurately estimate all the triphone HMMs. To reduce the number of the different triphone HMMs, top-down or bottom-up clustering or the like is adopted, as detailed in the references noted above. Where the number of HMMs is reduced, however, it is no longer possible to guarantee the best fitness of the HMMs as such. In addition, such problem as having resort to intelligence concerning unreliable phonemes is posed.

SUMMARY OF THE INVENTION

An object of the present invention is to provide a method of and an apparatus for large vocabulary number speech recognition, which permits indefinite speaker's speech recognition highly accurately without setting triphones or like recognition units and by taking even environment dependency of phonemes into considerations.

According to an aspect of the present invention, there is provided a speech recognition method of recognizing unknown input speech expressed as feature vector time series comprising the steps of storing phoneme symbol series of a plurality of recognition subject words, probabilities of N by N mutual state transitions of N states given sequential numbers to one another and phoneme symbol output probabilities and feature vector output probabilities associated with the individual state transitions; calculating probabilities of sets of feature vector time series and unknown input speech and phone symbol series of provisional recognition subject words from an ergodic hidden Markov model; and outputting a maximum probability word among all the recognition subject words.

According to another aspect of the present invention, there is provided a speech recognition method of recognizing unknown input speech expressed as feature vector time series, comprising the sets of storing phone symbol series of a plurality of recognition subject words, probabilities of N by N mutual state transitions of N states given sequential numbers to one another, phoneme symbol output probabilities and feature vector output probabilities associated with the individual state transitions and speaker's cluster numbers; and outputting a maximum probability word among all the recognition subject words.

According to another aspect of the present invention, there is provided a speech recognition apparatus for recognizing unknown input speech expressed as feature vector time series comprising: a word dictionary unit for storing a plurality of phoneme symbol series of a plurality of recognition subject words; a transition probability memory unit for storing transition probabilities associated with N by N mutual state transitions of N states given sequential numbers to one another; an output probability memory unit for storing phoneme symbol output probabilities and feature vector output probabilities associated with the individual state transitions; a word comparing unit for calculating probabilities of sets of feature vector time series of unknown input speech and phoneme symbol series of provisional recognition subject words; and a recognition result output unit for outputting maximum probability word among all the recognition subject words as recognition result.

According to still another aspect of the present invention, there is provided a speech recognition apparatus for recognizing unknown input speech expressed as feature vector time series comprising: a word dictionary unit for storing phone symbol series of a plurality of recognition subject words; a transition probability memory unit for storing transition probabilities associated with N by N mutual state transitions of N states given serial numbers to one another; an output probability memory unit for storing phone symbol output probabilities and feature vector output probabilities associated with the individual state transitions and speaker's cluster numbers; a word comparing unit for calculating probabilities of sets of feature vector time series of unknown input speech and phone symbol series of provisional recognition subject words; and a recognition result output unit for outputting a maximum probability word among all the recognition subject word and speaker's cluster numbers as recognition result.

The phoneme symbol is of a symbol by which a recognition subject word is defined absolutely or unanimously and is a syllable.

According to the present invention, speaker's cluster numbers associated with respective state transition may also be stored, and probabilities for time series of feature vector of unknown input speech, and sets of phoneme symbol series of provisional recognition subject words and provisional speaker's cluster number may be calculated, thereby outputting a maximum probability word among all the recognition subject words and speaker's cluster numbers.

The method of and apparatus for speech recognition according to the present invention is greatly different from the prior art method in that while in the prior art method feature vectors alone are provided in HMMs, according to the present invention phoneme symbols are also provided in HMM and speaker's cluster numbers are further provided in the HMM. Furthermore, in the prior art a word HMM is constructed as reference pattern for each recognition subject word by connecting together triphone HMMs, whereas according to the present invention a single ergodic HMM is used as common reference pattern for all recognition subject words. That is, according to the present invention natural and common use of model parameter is realized.

Other objects and features will be clarified from the following description with reference to attached drawings.

PREFERRED EMBODIMENTS OF THE INVENTION

Preferred embodiments of the present invention will now be described with reference to the drawings.

Figure 1:
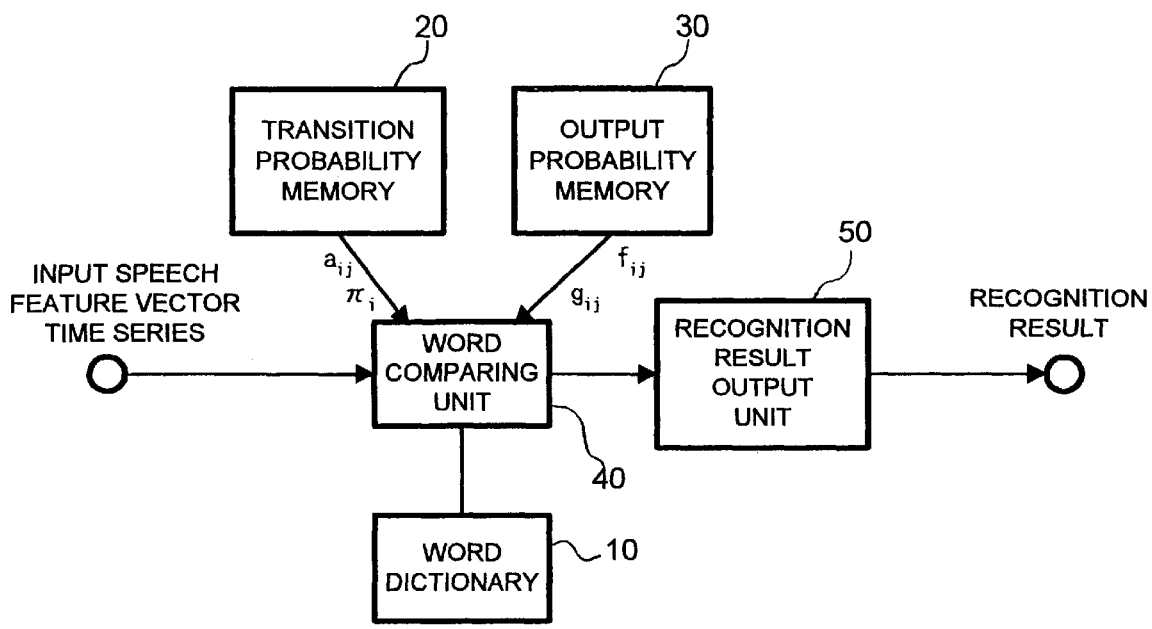
FIG. 1 shows a block diagram of a speech recognition apparatus according to an embodiment of the present invention.

An embodiment of the speech recognition apparatus according to the invention is shown in FIG. 1. The speech recognition apparatus, which can recognize unknown input speech expressed as feature vector time series, comprises a word dictionary unit 10 for storing phoneme symbol series of a plurality of recognition subject words, a transition probability memory unit 20 for storing transition probabilities associated with N×N mutual state transitions of N states in a given order to one another, an output probability memory unit 30 for storing phoneme probabilities and feature vector output probabilities associated with the respective state transitions, a word comparing unit 40 for calculating probabilities of sets of unknown speech feature vector time series and hypothetical recognition subject words, and a recognition output unit 50 for providing a highest probability word among all the recognition subject words as a result of recognition.

The input speech is expressed as time series X $$X = x_1 x_2 \ldots x_t \ldots x_T$$

of feature vectors $x_t$, where feature vector $x_t$ is, for instance, a 10-dimensional cepstrum vector, subscript t being number (natural number) representing sequential time.

In the word dictionary unit 10, phoneme symbol series of recognition subject words are stored. The phoneme symbol may sufficiently be of a symbol unit less than a word, for instance a syllable, by which a recognition subject word can be defined absolutely or unanimously (that is, definitively).

m-th recognition subject word is expressed as $w_m$, and its phoneme symbol series is expressed as $$w_m p_1 p_2 \ldots p_{Km}$$

where Km represents the length of the phoneme symbol series. The total number of phoneme symbols is $N_p$, and these phoneme symbols are given serial numbers.

TABLE 1

| Number | 1 | 2 | 3 | 4 | 5 | 6 | ... | Np |
|---|---|---|---|---|---|---|---|---|
| Phoneme Symbol | A | I | u | E | o | K | ... | ... |

For example, with a recognition subject word given by phonemes "akai", $p_1=1$, $p_2=6$, $p_3=1$, $p_4=2$, and Km=4. The total number of recognition subject words is $N_w$. While in this embodiment phoneme symbols are used to express words, it is also possible to use other symbol systems such as syllables.

Figure 2:
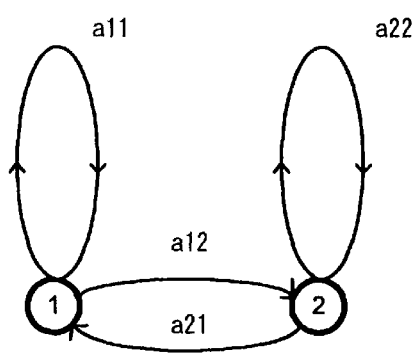
FIG. 2 shows probability of state transition from the state 1 to the state 2.

The HMM employed for speech recognition in this embodiment is ergodic HMM using ergodic Markov chain. The ergodic HMM is detailed in the literatures noted above. FIG. 2 is a view illustrating the ergodic HMM, which will now be described. Specifically, states 1 and 2 and all transitions associated with these states are shown. For example, $a_{12}$ in FIG. 2 represents the probability of state transition from the state 1 to the state 2. In the following, a case is considered, in which typically an ergodic HMM constituted by Ns states and mutual state transitions associated therewith is employed.

In the transition probability memory 20, probabilities of ergodic HMM state transitions are stored. The probabilities of transitions from i-th to j-th state are expressed as $a_{ij}$. The probabilities $a_{ij}$ meet conditions that their values are at least zero and that the sum of their values is 1, as shown by the following formula. The initial probabilities of the states are $$a_{ij} \geq 0,$$

$$\sum_{j=1}^{N_S} a_{ij} = 1$$

also stored in the transition probability memory 20. The initial probabilities of i-th state are expressed as $\pi_i$. The initial probabilities $\pi_i$ meet the following conditions.

$$\pi_i \geq 0,$$

$$\sum_{i=1}^{N_S} \pi_i = 1$$

In the output probability memory 30, phoneme symbol output probabilities and feature vector output probabilities associated with state transitions are expressed as $f_{ij}(p)$ where p represents p-th phoneme symbols. Since the number of different phoneme symbols is $N_p$, $$\sum_{p=1}^{N_p} f_{ij}(p) = 1$$

For example, $f_{ij}(1)$ represents the probability of output of phoneme symbol "a" in association with state transitions from i-th to j-th state.

Feature vector output probabilities associated with state transitions from i-th to j-th are expressed as $g_{ij}(x)$. The feature vector output probabilities $g_{ij}(x)$ are herein expressed as multi-dimensional Gaussian distribution.

$$g_{ij}(x) = \frac{1}{\sqrt{(2\pi)^D |\Sigma_{ij}|}} \exp[-(x - \mu_{ij})^t \Sigma_{ij}^{-1} (x - \mu_{ij})]$$

where D is the dimension number of the feature vectors, $\mu_{ij}$ is the mean vector, and $\Sigma_{ij}$ is the covariance matrix.

The word comparing unit 40 calculates probabilities (or likelihoods) of $N_w$ recognition subject words. The logarithmic value of probability $P(w_m, X)$ of m-th recognition subject word $w_m$ is calculated as follows. As noted before, $w_m = p_1 p_2 \ldots p_k \ldots p_{Km}$, and
$X = x_1 x_2 \ldots x_t \ldots x_T$.

The partial sum of logarithmic probabilities is defined as:
$\phi_0(i,1) = \log [\pi_i]$,
$\phi_0(i, k) = -\infty$
 $(1 < k < K_m)$
$\phi_t(i,k) = \max \lfloor \max[\phi_{t-1}(j,k')] + \log \lfloor a_{ji} \rfloor + \log \lfloor f_{ji}(p_k) \rfloor + \log \lfloor g_{ji}(x_t) \rfloor \rfloor$ $j = 1, \ldots, N_S$ $k' = k-1, k$
$(1 \leq t \leq T, 1 \leq i \leq N_S, 1 \leq k \leq K_m)$ Using the above initialization and recurrence formula, the word comparing unit 40 calculates the partial sum $\phi_t(i, k)$ of logarithmic probablities as three-dimensional array specified by three subscripts of t-th time, i-th state and k-th phoneme symbol for all times $1 \leq t \leq T$, all states $1 \leq i \leq Ns$ and all phoneme symbols $1 \leq k \leq Km$ in recognition subject word.

From the partial sum $\phi_t(i, km)$ of logarithmic probabilities thus obtained, the logarithmic value of probablities $P(w_m, X)$ of m-th recognition subject word $w_m$ is obtained as:

log[P($w_m$, X)]=max[$\phi_T$(i,$K_m$)]
i=1, . . . , $N_S$

Figure 3:
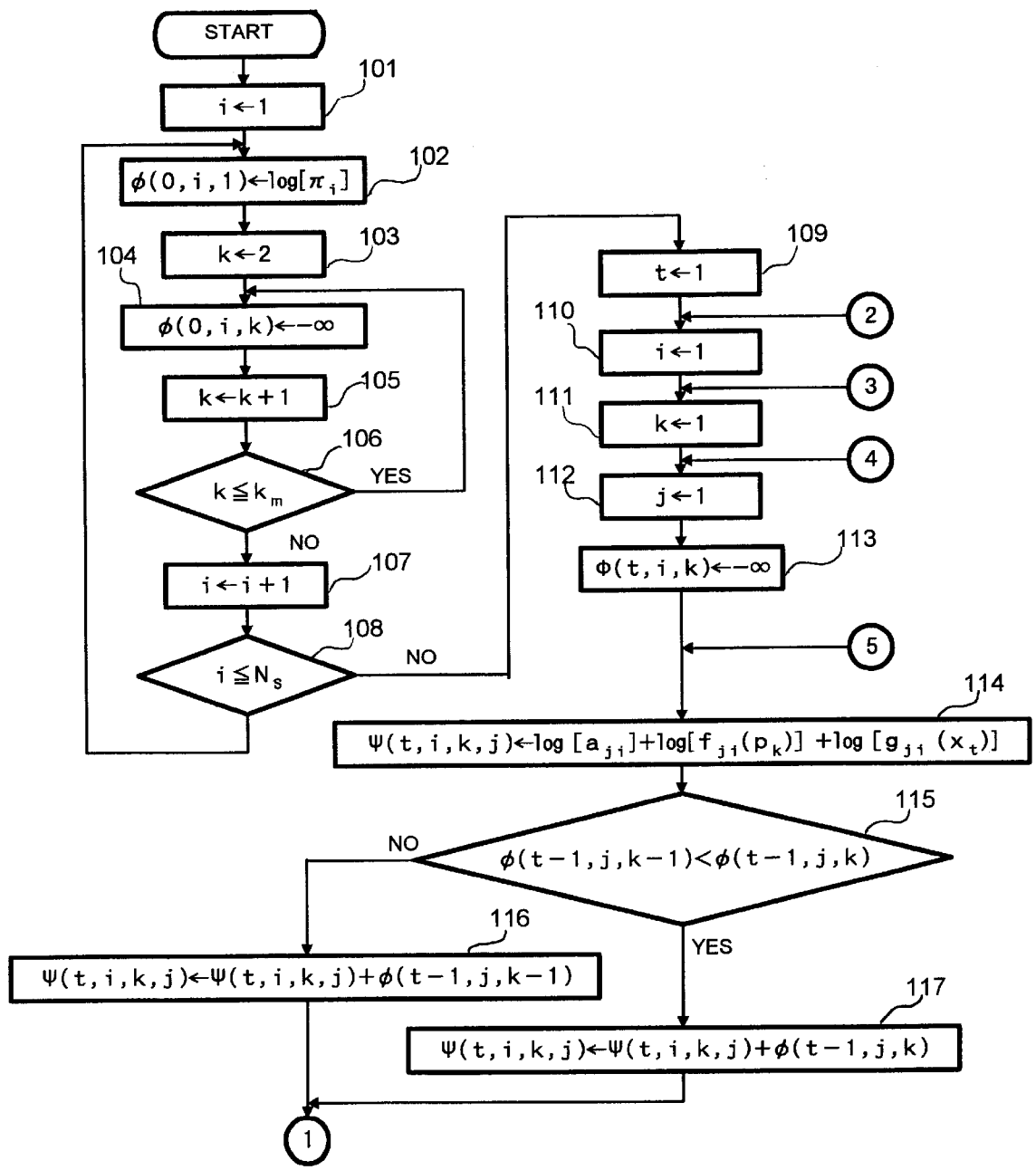
FIGS. 3 and 4 are flow charts illustrating a specific example of the routine.
Figure 4:
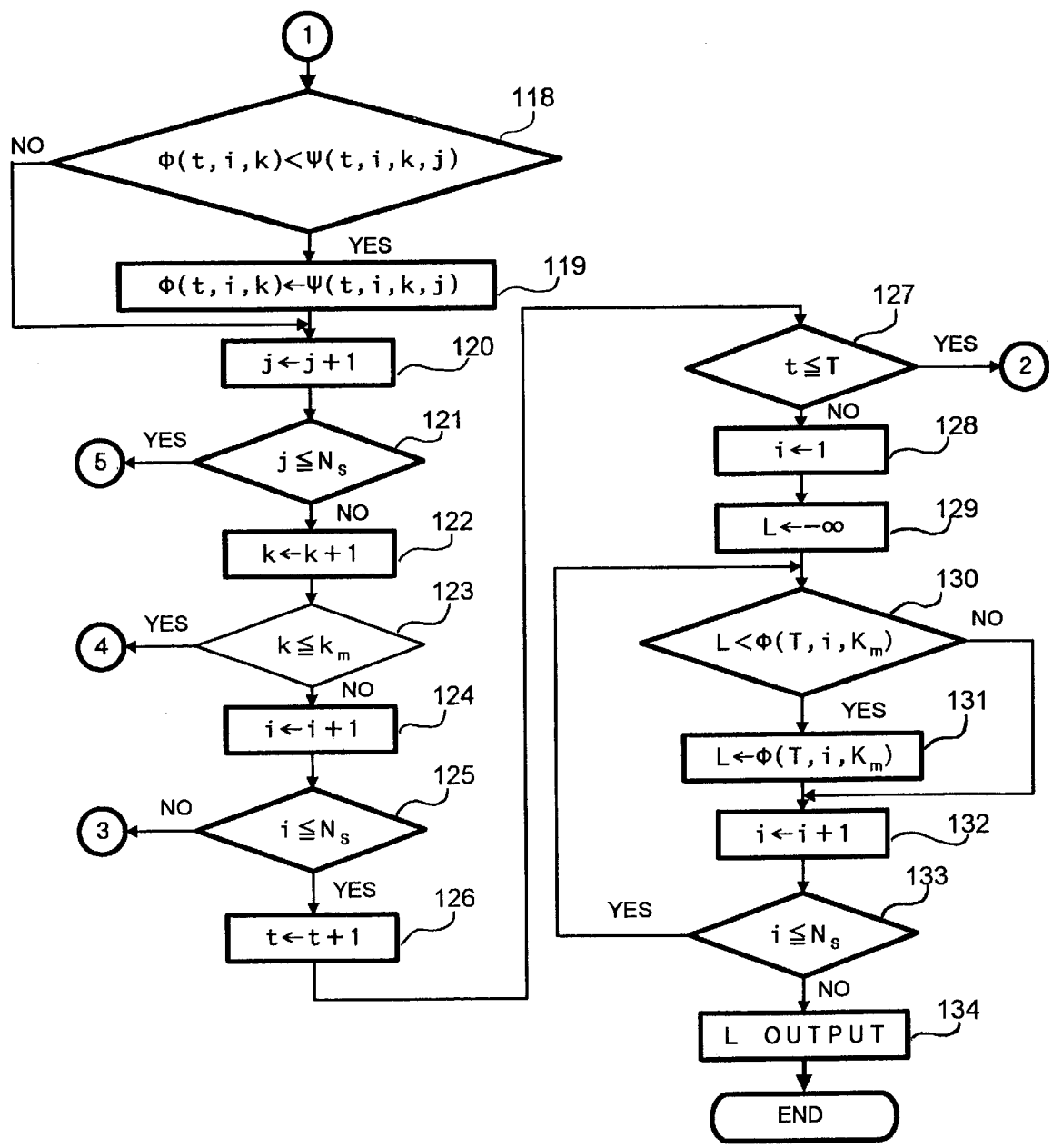

The word comparing unit 40 calculates the logarithmic probabilities of all the recognition subject words. FIGS. 3 and 4 are flow charts illustrating a specific example of the routine of the above process. In steps 101 to 108, the partial sum of logarithmic probabilities is initialized, in steps 109 to 133 the logarithmic value L of probability is calculated, and in step 134 the logarithmic value L is outputted. In the initialization routine, in step 102 i-th initial probability πi is substituted into φ(0, i, 1) corresponding to t=0, k=1. For φ(0, 1, k) when k is at least 2, −∞ is substituted in step 104. Since logarithmic probabilities are dealt with at this moment, −∞ corresponds to anti-logarithm zero. Likewise, in sep 113 −∞ is substituted into Φ(t, i, k) as logarithm of anti-logarithm zero.

When the probabilities of all the recognition subject words have been obtained in the above way, the recognition result output unit 50 outputs word $W_{\hat{m}}$ which gives the maximum probability among these probabilities as a recognition result. That is, $$\hat{m} = \underset{m=1,\ldots,N_W}{\mathrm{argmax}} \ [\log[P(w_m, X)]]$$

While a preferred embodiment of the present invention has been described, it is by no means limitative. For example, while in the above embodiment the HMM output is provided by having feature vector output probabilities and phoneme symbol output probabilities associated with state transitions, it is possible to have also speaker's cluster number output probabilities associated with state transitions.

Where the speaker's cluster number output probabilities associated state transitions, the speaker's cluster number output probabilities are expressed as $h_{ij}(q)$. Where the total number of speaker's clusters is $N_Q$, we have $$\sum_{q=1}^{N_Q} h_{ij}(q) = 1$$

The speaker's cluster numbers are stored in the output probability memories 30. The initialization and recurrence formula noted above are expanded with the partial sum of logarithmic probabilities as a four-dimensional array as $\phi_0$(i,1.q)=log[$\pi_i$],
$\phi_0$(i,k,q)=−∞,
(1<k≦$K_m$,1≦q≦Q)

From the partial sum of logarithmic probabilities $\phi_t$(i,k,q)=max[max[$\phi_{t-1}$(j,k',q)]+log[$a_{ji}$]+log[$f_{ji}(p_k)$]+log[$g_{ji}$($x_t$)]+log[$h_{ji}$(q)]]
k'=k−1,k
j=1, . . . , $N_S$
(1≦t≦T,1≦i≦$N_S$,1≦k≦$K_m$,1≦q≦Q)

From the partial sum of logarithm probabilities thus obtained, the logarithmic value of probability of recognition subject word wm is obtained as log[P($w_m$, X)]=max[max$\phi_T$(i,$K_m$,q)]
i=1, . . . , $N_S$ q=1, . . . , Q These calculations are executed in the word comparing unit 40.

The recognition result output unit 50 outputs a word of the maximum probability among all the recognition subject words and speaker's cluster numbers as a recognition result.

By adding the speaker's cluster numbers to the ergodic HMM output, it is possibe to obtain speech recognition even with automatic determination of the optimum speaker character even in speaker independent speech recognition.

As has been described in the foregoing, according to the present invention by using a single ergodic HMM for outputting phoneme symbol series and feature vector series it is possible to realize a large vocabulary speech recognition apparatus, which does not require setting "triphones" or like recognition units and takes even environment dependency of phonemes into consideration. In addition, by adding speaker's cluster numbers to the output of the ergodic HMM output, it is possible to realize an apparatus, which can recognize speech with automatic determination of optimum speaker character even in speaker independent speech recognition.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A speech recognition method of recognizing unknown input speech expressed as feature vector time series, the method comprising the steps of:

storing phoneme symbol series of a plurality of recognition subject words, probabilities of N by N mutual state transitions of N states given sequential numbers with respect to one another and phoneme symbol output probabilities and feature vector output probabilities associated with each of the N×N mutual state transitions;

calculating probabilities of sets of feature vector time series of unknown input speech and phoneme symbol series of provisional recognition subject words from an ergodic hidden Markov model, the probabilities being logarithmic probabilities computed as a three-dimensional array specified by time as a first dimension, state transition number as a second dimension, and phoneme symbol number as a third dimension; and outputting a maximum probability word among all the provisional recognition subject words.

2. The speech recognition method as set forth in claim 1, wherein the phoneme symbol is of a symbol by which a recognition subject word is defined definitively.

3. The speech recognition method as set forth in claim 1, wherein the phoneme symbol is a syllable.

4. The speech recognition method as set forth in claim 1, wherein the feature vector time series is calculated as a multi-dimensional gaussian distribution.

5. The speech recognition apparatus as set forth in claim 1, wherein the ergodic Hidden Markov Model has N states and wherein N×N=$N^2$ mutual transitions exist between the N states of the ergodic Hidden Markov Model.

6. The speech recognition apparatus as set forth in claim 5, wherein, for each of the $N^2$ mutual transitions, a phoneme symbol output probability and a feature vector output probability are defined.

7. A speech recognition apparatus for recognizing unknown input speech expressed as feature vector time series, comprising:

a word dictionary unit for storing a plurality of phoneme symbol series for each of a plurality of recognition subject words;

a transition probability memory unit for storing transition probabilities associated with N by N mutual state transitions of N states given sequential numbers with respect to one another;

an output probability memory unit for storing phoneme symbol output probabilities and feature vector output probabilities associated with each of the N×N mutual state transitions;

a word comparing unit for calculating probabilities of sets of feature vector time series of unknown input speech and phoneme symbol series of provisional recognition subject words, the probabilities being logarithmic probabilities computed as a three-dimensional array specified by time as a first dimension, state transition number as a second dimension, and phoneme symbol number as a third dimension; and a recognition result output unit for outputting a maximum probability word among all the provisional recognition subject words as a recognition result.

8. The speech recognition apparatus as set forth in claim 7, wherein the phoneme symbol is of a symbol by which a recognition subject word is defined definitively.

9. The speech recognition method as set forth in claim 7, wherein the phoneme symbol is a syllable.

10. The speech recognition apparatus as set forth in claim 7, wherein the feature vector time series of the unknown input speech is calculated as a multi-dimensional gaussian distribution.

11. A speech recognition apparatus for recognizing unknown input speech expressed as feature vector time series, comprising:

a word dictionary unit for storing phoneme symbol series for each of a plurality of recognition subject words;

a transition probability memory unit for storing transition probabilities associated with N by N mutual state transitions of N states given serial numbers with respect to one another;

an output probability memory unit for storing phoneme symbol output probabilities and feature vector output probabilities associated with each of the N×N mutual state transitions and speaker's cluster numbers;

a word comparing unit for calculating probabilities of sets of feature vector time series of unknown input speech and phoneme symbol series of provisional recognition subject words, the probabilities being logarithmic probabilities computed as a four-dimensional array specified by time as a first dimension, state transition number as a second dimension, phoneme symbol number as a third dimension, and the speaker's cluster numbers as a fourth dimension; and a recognition result output unit for outputting a maximum probability word among all the provisional recognition subject words and the speaker's cluster numbers as a recognition result.

12. The speech recognition apparatus as set forth in claim 11, wherein the phoneme symbol is of a symbol by which a provisional recognition subject word is defined definitively.

13. The speech recognition apparatus as set forth in claim 11, wherein the phoneme symbol is a syllable.

14. The speech recognition apparatus as set forth in claim 11, wherein the feature vector time series of the unknown input speech is calculated as a multi-dimensional gaussian distribution.

* * * * *